Nov. 9, 1965  J. H. SAKURADA  3,217,092
CLIP FOR ELECTRICAL CONDUCTING PIPE JOINT
Filed June 13, 1963
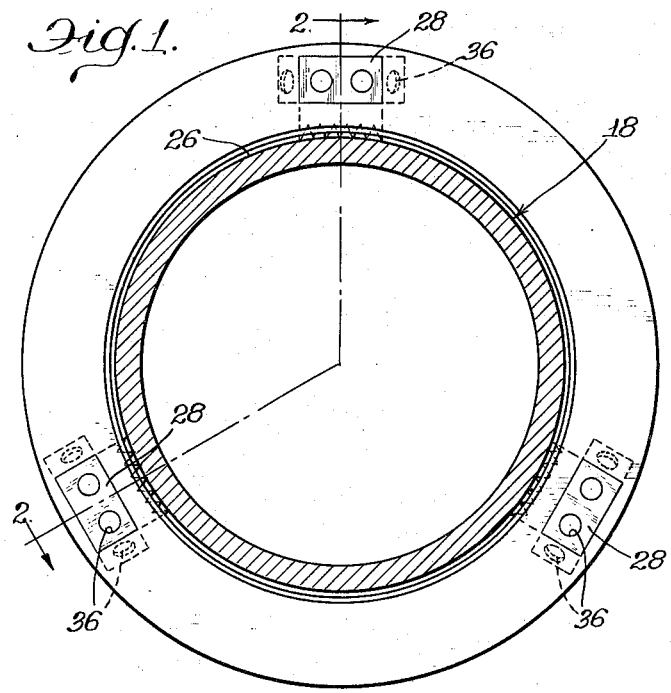
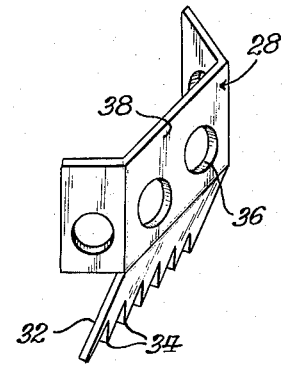
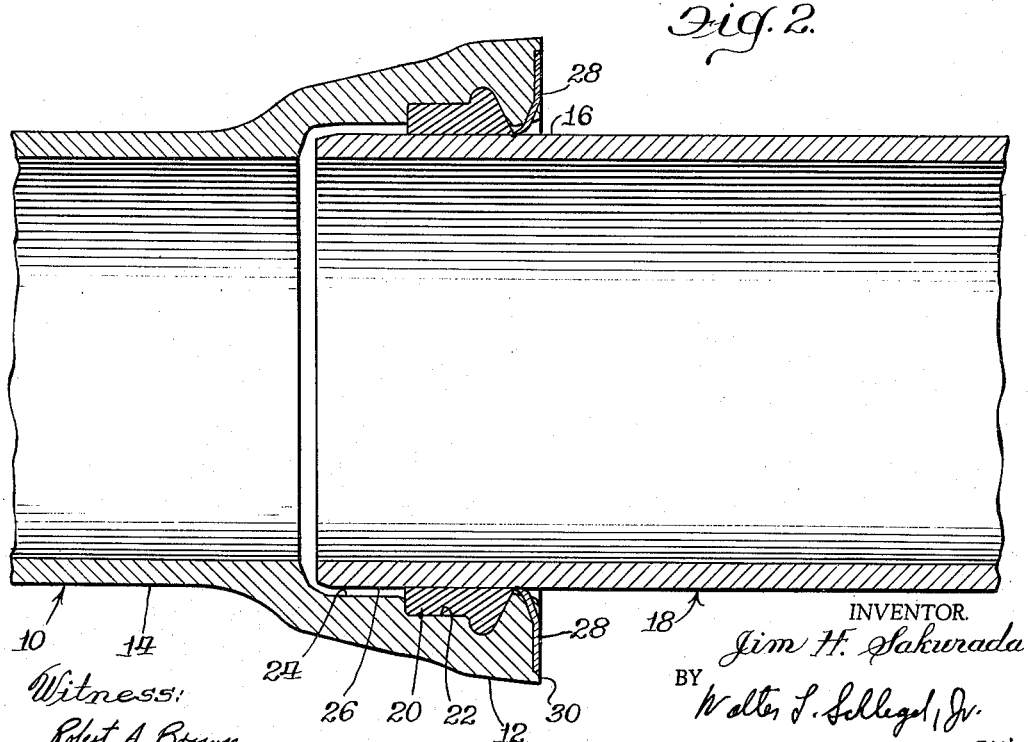
INVENTOR.
Jim H. Sakurada

United States Patent Office 3,217,092
Patented Nov. 9, 1965

3,217,092
CLIP FOR ELECTRICAL CONDUCTING
PIPE JOINT
Jim H. Sakurada, Chicago, Ill., assignor to Amsted Industries Incorporated, Chicago, Ill., a corporation of New Jersey
Filed June 13, 1963, Ser. No. 287,645
7 Claims. (Cl. 174—78)

This invention relates to pipe joints and more particularly to means for transmitting electrical energy between longitudinally connected pipe sections.

It is well known that water transmission pipe lines must be conducive to transfer or transport of water 24 hours a day throughout the entire year in all kinds of weather. This it is apparent that during periods of sub-freezing temperatures it is likely that water standing in pipe lines may freeze. Of course, if this procedure continues unabated, the subsequent collecting of ice will not only impede the transmission of water in the pipe line, but it might also expand to such a degree that pipe sections are broken. The usual way to combat this problem is to provide for the introduction of electrical energy into the pipe line during periods of sub-freezing temperatures. In order to ensure that the passage of electrical current may be transmitted throughout the length of a pipe line, it becomes necessary to provide for an electrical conductor of some type between each adjoining pipe section.

Accordingly, it is an object of this invention to provide a connection that will transfer electrical energy between adjoining sections of a pipe joint.

An additional object of this invention is to provide an electrical connection between bell and spigot ends connected in a pipe joint.

It is a further object of this invention to provide an electrical connection between pipe sections connected in a butt-joint.

Other objects and advantages of this invention will become apparent when reference is made to the following written description considered in conjunction with the accompanying drawings wherein:

FIGURE 1 is an end elevational view of a pipe joint, partly in section, showing the preferred location of the electrical clips.

FIGURE 2 is a side sectional view of a bell and spigot pipe joint taken along line 2—2 of FIGURE 1.

FIGURE 3 is an isometric view of one of the several clips which may be used in a pipe joint to effect an electrical connection between pipe sections.

Referring now to the drawings a first pipe section is indicated generally by the number 10. An enlarged bell portion 12 is formed on one end 14 of the pipe section 10 to receive a straight or spigot end 16 of a second pipe section 18. A gasket 20 is received by a recess 22 formed in an inner circumferential surface 24 of the bell portion and is located about an outer circumferential surface 26 of said spigot end to serve as a seal between two pipe sections.

A plurality of clips 28, 28, 28 are spaced generally equidistant about an end surface 30 of the bell portion and are preferably secured therein as by being fused during casting of the bell portion with the pipe.

A plurality of holes 36 are formed through an outward portion 38 of said clips and receive solidifying metal during the casting of the pipe to fuse the clips to said end surface 30. It shall be also noted that the clips may be secured in any other suitable manner such as welding, brazing, bolting, or the like.

An inward or lower portion 32 of each clip is bent at a slight angle and has a plurality of teeth 34 formed to engage said outer circumferential surface 26 of the second pipe section 18. Said inward portion of each clip extends inwardly of the inner circumferential surface 24 of the bell portion and is subjected to cantilever loading stress when the teeth 34 engage the spigot end of the second pipe section. The angle at which said lower portion is bent serves to minimize the force required to insert the spigot end of the second pipe section into the bell end of the first pipe section.

During the assembly process the teeth 34 of the clip dig into and penetrate any oxide coating that may be present in the outside of the second pipe section and engage the surface thereof to ensure a positive contact between pipe sections. The resultant effect is the establishment of an electrically conductive joint so that an electrical current may be transmitted from one pipe to the other pipe in a pipe joint.

Although but one embodiment of the invention is disclosed and described herein, it is apparent that other embodiments and modifications are possible within the scope of the appended claims.

I claim:

1. A pipe joint comprising a pair of metal pipe sections telescopically abutting end-to-end, a first of the sections having a bell end with an end surface and the second section having a spigot end telescopically received in the bell end, and a plurality of metal clips secured to said end surface in firm electrical engagement therewith, said clips extending radially inwardly beyond the inner surface of the bell section, and having a limited degree of resilience, said clips in their normal position extending radially inwardly beyond the outer dimension of said spigot end of said second section, the inner ends of the clips being flexed inwardly in response to insertion of said spigot end of the bell end of the first section, and the resilience of the clips being effective for forcing engagement by the radially inner ends of the clips with the outer surface of the spigot end of the second section.

2. The invention set out in claim 1 wherein the radially inner ends of all of the clips are bent axially inwardly from the open end of the bell and frictionally engages the spigot end.

3. The invention set out in claim 2 wherein the clips have teeth formed on their radially inner ends.

4. The invention set out in claim 1 wherein the clips are integrally welded to the pipe section to which they are attached.

5. The invention set out in claim 4 wherein the clips include radially outer portions having main flat parts with bent side wing portions, and have holes in their radially outer portions, said radially outer portions engage the end surface of the pipe section to which they are secured, the clips are embedded in the material of the pipe section to a depth in which the main part of their axially outer surface is substantially flush with the end surface of the pipe section, the clips are integrally welded to the pipe section and the material of the pipe section engages, in welded relation, around outer edges of the clips and the marginal edges of the holes therein.

6. The invention set out in claim 1 wherein the bell section has a circumferentially extending recess in its inner surface adjacent said end surface, and a resilient gasket is interposed in said recess which is of such dimension as to yieldably and frictionally engage the spigot section, and the gasket is positioned axially relative to said end surface that the radially inner ends of the clips are closely proximate to said gasket.

7. A clip of the character disclosed for incorporation in a pipe section for establishing electrical connection between that pipe section and another cooperating section to be used in conjunction therewith, said clip being made of flat thin sheet-like metal having a main portion lying substantially in a plane and side wing portions extending laterally therefrom and disposed at an acute angle to said plane, said main portion and wings having holes therethrough, the clip also having a lower portion extending downwardly at an acute angle to said plane but on a line transverse to the lines of the angles of the side wing portions, said lower portion having teeth in its lower edge most remote from and parallel with the line of the angle of said bottom portion.

References Cited by the Examiner

UNITED STATES PATENTS

| | | | |
|---|---|---|---|
| 1,148,324 | 7/15 | Kenny | 285—421 |
| 1,827,249 | 10/31 | McCoy | 285—421 |
| 2,832,615 | 4/58 | Summers | 285—342 |
| 2,966,539 | 12/60 | Sears et al. | 138—33 X |
| 2,991,092 | 7/61 | MacKay | 285—231 X |
| 3,122,604 | 2/64 | Cook et al. | 174—51 |

FOREIGN PATENTS 11,360　5/06　Great Britain.

JOHN F. BURNS, *Primary Examiner.*

DARRELL L. CLAY, *Examiner.*